(12) United States Patent
Bijou

(10) Patent No.: US 11,913,758 B2
(45) Date of Patent: Feb. 27, 2024

(54) AIRBORNE DRONES WITH NON-PHYSICAL DISTRACTORS

(71) Applicant: QUISnet, Inc., Draper, UT (US)

(72) Inventor: Christopher Bijou, Draper, UT (US)

(73) Assignee: QUISNET, Inc., Draper, UT (US)

( * ) Notice: Subject to any disclaimer, the term of this patent is extended or adjusted under 35 U.S.C. 154(b) by 261 days.

(21) Appl. No.: 17/016,247

(22) Filed: Sep. 9, 2020

(65) Prior Publication Data

US 2021/0071996 A1     Mar. 11, 2021

Related U.S. Application Data

(60) Provisional application No. 62/897,706, filed on Sep. 9, 2019, provisional application No. 62/897,679, filed on Sep. 9, 2019, provisional application No. 62/897,716, filed on Sep. 9, 2019, provisional application No. 62/897,720, filed on Sep. 9, 2019.

(51) Int. Cl.

| | |
|---|---|
| *F41H 11/00* | (2006.01) |
| *G05D 1/00* | (2006.01) |
| *B64D 1/02* | (2006.01) |
| *B64C 39/02* | (2023.01) |
| *F41H 13/00* | (2006.01) |
| *B64U 10/13* | (2023.01) |
| *B64U 101/00* | (2023.01) |

(52) U.S. Cl.
CPC ............ *F41H 11/00* (2013.01); *B64C 39/024* (2013.01); *B64D 1/02* (2013.01); *G05D 1/0094* (2013.01); *G05D 1/104* (2013.01); *B64U 10/13* (2023.01); *B64U 2101/00* (2023.01); *F41H 13/0087* (2013.01)

(58) Field of Classification Search
CPC ... F41H 11/00; F41H 13/0087; B64C 39/024; B64C 2201/027; B64C 2201/12; B64D 1/02; G05D 1/0094; G05D 1/104

See application file for complete search history.

(56) References Cited

U.S. PATENT DOCUMENTS

| | | | |
|---|---|---|---|
| 9,085,362 B1* | 7/2015 | Kilian | B64F 1/027 |
| 10,155,587 B1* | 12/2018 | Tang | B64D 47/02 |
| 10,922,982 B2* | 2/2021 | Magdaleno | B64C 39/024 |
| 11,054,224 B1* | 7/2021 | Stephens | F41H 11/04 |
| 11,192,646 B2* | 12/2021 | Smith | B64D 47/08 |
| 11,255,643 B2* | 2/2022 | Ang | F41H 11/02 |
| 2017/0253348 A1* | 9/2017 | Ashdown | F41H 7/005 |
| 2018/0105271 A1* | 4/2018 | Wypyszynski | B64D 5/00 |
| 2018/0335779 A1* | 11/2018 | Fisher | G05D 1/0094 |
| 2019/0068953 A1* | 2/2019 | Choi | G01S 17/86 |
| 2019/0088156 A1* | 3/2019 | Choi | G09B 9/003 |
| 2020/0051438 A1* | 2/2020 | Magdaleno | G05D 1/104 |
| 2020/0407058 A1* | 12/2020 | Raz | B64D 47/08 |
| 2022/0057815 A1* | 2/2022 | Raz | H04R 1/323 |

\* cited by examiner

*Primary Examiner* — Benjamin P Lee

(57) ABSTRACT

Embodiments of the invention include a drone system or method for distracting a threat with a light source. In some embodiments, an environment can be scanned with a sensor that produces sensor data. A threat within the environment can be identified from the sensor data, and the location of the threat can be determined. The light source can be aimed toward the threat; and light may be directed from the light source toward the threat.

19 Claims, 13 Drawing Sheets

AIRBORNE DRONES WITH NON-PHYSICAL DISTRACTORS

SUMMARY

Embodiments of the invention include a drone system or method for distracting a threat with a light source. In some embodiments, an environment can be scanned with a sensor that produces sensor data. A threat within the environment can be identified from the sensor data, and the location of the threat can be determined. The light source can be aimed toward the threat; and light may be directed from the light source toward the threat.

Embodiments of the invention include a drone system or method for dropping barriers from a drone. In some embodiments, an environment can be scanned with a sensor that produces sensor data. A threat within the environment can be identified from the sensor data, and the location of the threat can be determined. One or more barriers can be dropped at or near the threat, between the threat and a target, or at or near the target.

Embodiments of the invention include a drone system or method for launching projectiles, gases, or liquids from a drone toward a target. In some embodiments, an environment can be scanned with a sensor that produces sensor data. A threat within the environment can be identified from the sensor data, and the location of the threat can be determined. One or more launchers can be directed toward the threat and one or more projectiles, liquids, or gases can be directed at or toward the threat.

Embodiments of the invention include a drone system or method for launching projectiles, gases, or liquids from a drone toward a target. In some embodiments, an environment can be scanned with a sensor that produces sensor data. A threat within the environment can be identified from the sensor data, and the location of the threat can be determined. One or more adhesive surfaces on the drone may be exposed. And the drone may be direct directly toward the threat.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to distract a threat using non-physical means to delay the threat's window of opportunity to impose harm. In addition, delaying a threat may allow other responders or actions time to neutralize the threat.

Figure 1A:
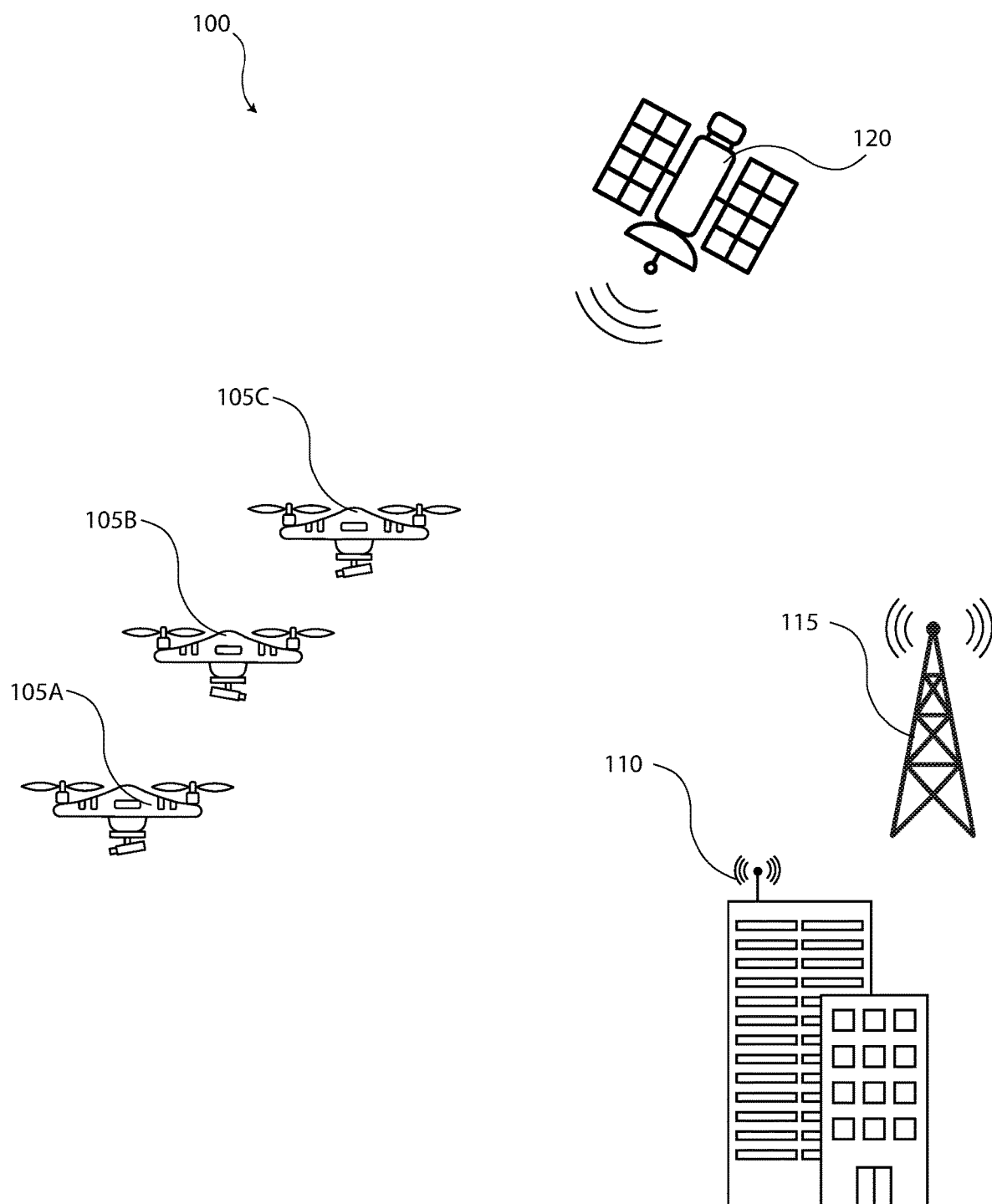
FIG. 1A illustrates an example drone network according to some embodiments.

FIG. 1A illustrates an example drone network 100 according to some embodiments. The drone network 100 may include a plurality of drones 105A, 105B, 105C (individually or collectively drones 105). The drone network 100 may include one or more satellites 120, one or more terrestrial wireless towers 115 or one or more terrestrial antennas 110. The drone network 100 may also include one or more terrestrial sensor network that may include, for example, video cameras, microphones, entry sensors, etc.

The drones 105 may include any type of drones such as, for example, autonomous drones, semi-autonomous drones, or user operated drones. The drones, for example, may include an unmanned aerial vehicle, a quadcopter, a multi-rotor drone, micro air vehicle, etc. In some embodiments, the drones may include one or more sensors such as, for example, cameras, microphones, etc. In some embodiments, the drones may include any type of distractor such as, for example, lasers, physical distractor, non-physical distractors, guns, cannons, spray guns, etc.

In some embodiments, the drones 105 may communicate wirelessly with each other. For example, the drones may communicate position and trajectory data with each other such as, for example, to avoid future collisions. As another example, the drones 105 may communicate terrestrial mapping information that may include data regarding the terrestrial profile of the area within which the drones are flying.

In some embodiments, the drones 105 may communicate wirelessly with one or more satellites 120. For example, a satellite 120 may communicate current GPS data to the drone 105. In some embodiments, a drone 105 may be in communication with a terrestrial communication system that may include one or more terrestrial wireless towers 115 or one or more terrestrial antennas 110. A ground station or command center may communicate data to and from the drones 105 via a satellite 120, a terrestrial wireless towers 115, or a terrestrial antenna 110. This data may include, for example, location, altitude, telemetry, trajectory, target data, flight time, return time, mission data, software updates, video, audio, etc.

In some embodiments, the drones 105 may operate within an environment that may include a street, a terminal, a stadium, a park, a concert, a theater, a political rally, a sporting event, a rally, a parade, etc.

Figure 2A:
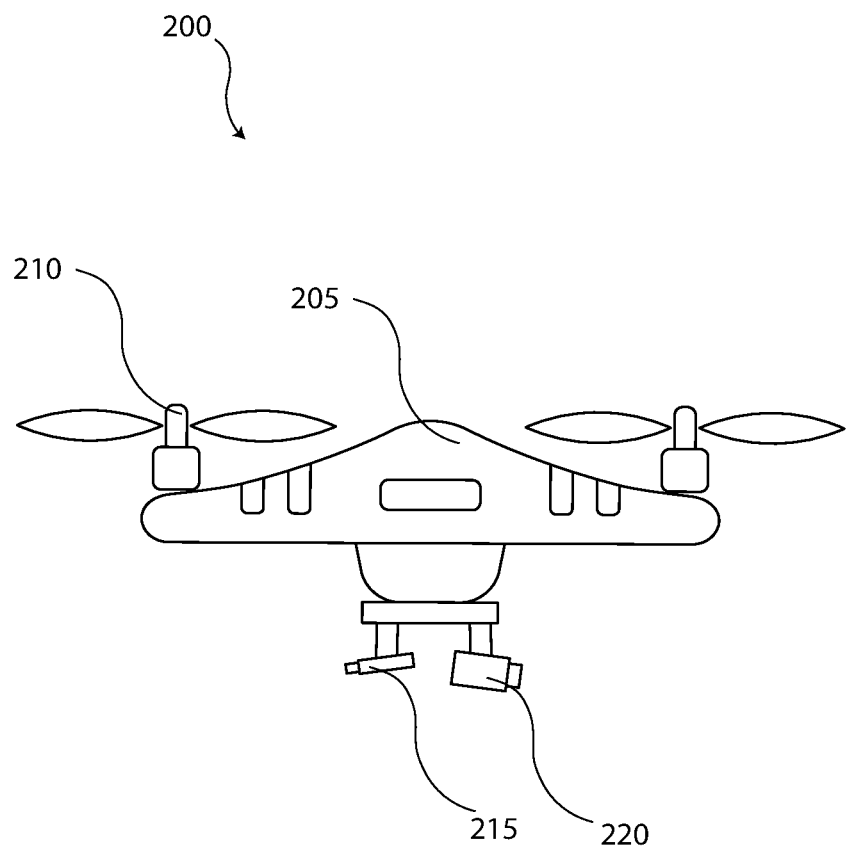
FIG. 2A is an illustration of a distractor drone according to some embodiments.

FIG. 2A is an illustration of a distractor drone 200 according to some embodiments. The distractor drone 200, for example, may include a drone body 205, one or more rotors 210 (or any other propulsion or lift mechanism/system), a light source 215, or a sensor 220. In some embodiments, the distractor drone 200 may include wireless communication systems that can communicate with various other devices or locations such as, for example, with satellite 120, other drones, terrestrial wireless towers 115, terrestrial antennas 110, mobile devices (e.g., phones, tablets, remote controllers, etc.), external sensors, external cameras, etc.

The sensor 220, for example, may include one or more video cameras or one or more microphones. The sensor 220, for example, may be disposed on a swivel that allows the sensor 220 to rotate 360 degrees and zero to ninety degrees from horizontal. The sensor 220 may communicate sensor data to a remote user or computer system via satellite 120, other drones, terrestrial wireless towers 115, terrestrial antennas 110, mobile devices (e.g., phones, tablets, remote controllers, etc.), external sensors, external cameras, etc.

In some embodiments, the light source 215 may include a laser, laser diode, diodes, etc. In some embodiments, the light source 215 may be focused or have a small divergence. In some embodiments, the divergence of the light source 215 may depend on the potential distraction range. In some embodiments, the light source 215 may produce a light pattern having multiple beams to increase the likelihood of distracting the threat with light. In some embodiments, the light source 215 may include a class 1, class 2, class 3R, class 3B, or class 4 laser.

In some embodiments, the drone 200 may include a computational system (e.g., computational system 400) that can process data from the sensor 220 and determine a threat, determine a location of the threat, and direct light from the light source 215 at the threat.

Figure 3A:
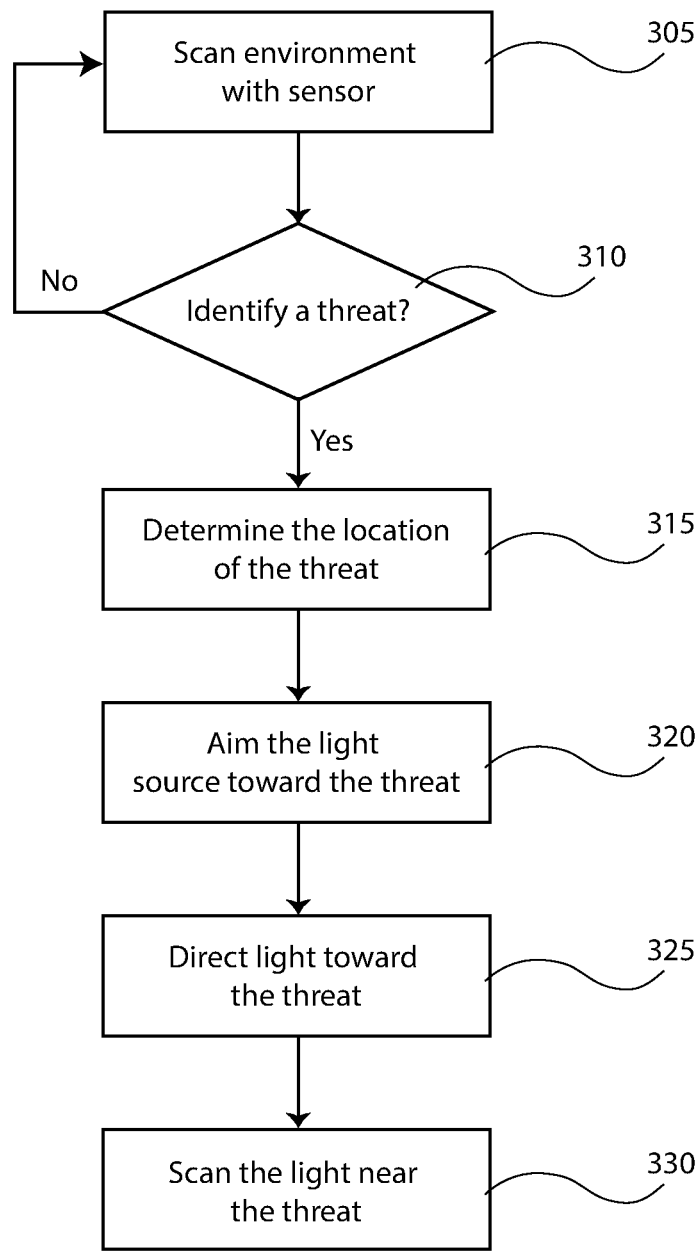
FIG. 3A is a flow chart of a process for distracting a threat using a drone according to some embodiments.

FIG. 3A is a flow chart of a process 300 for distracting a threat using a drone according to some embodiments. The process 300 may include additional blocks or steps. Any of the blocks shown in process 300 may be removed or executed in different order.

The process 300 may be executed in full or in part by a computation system on the drone, at a remote location (e.g., near the terrestrial antenna 110), at the satellite 120, on a nearby drone, etc.

The process 300 may begin at block 305. The environment may be scanned with a sensor. For example, the environment may be scanned with the sensor 220 mounted on the drone 200. As another example, the environment may be scanned with a terrestrial mounted sensor 220. As another example, the environment may be scanned by a sensor mounted on another nearby drone.

At block 310, the sensor 220 data can be used to identify a threat. The sensor data may include sensor data from one or more sensors on the drone 105, the satellite 110, or a terrestrial sensor, etc. In some embodiments, various artificial intelligence techniques may be used when scanning the environment to determine whether a threat is present. As an example, threat may be identified by visually detecting the presence of a weapon, a gun, a knife, or a bomb or by audibly detecting a gun shot or words identified as consistent with a threat (e.g., "bomb", "gun", "die", etc.).

For example, an artificial intelligence system (e.g., operating on or with a computational system on the drone or within the system 100), may be trained to identify a weapon by training the algorithm with a plurality of images that have a weapon identified. This training can be used so the artificial intelligence system can identify a weapon within the environment.

At block 315 the location of the threat may be identified. For example, if data from the sensor 220 on the drone 200 identifies the threat, then the location of threat may be determined based on the GPS position of the drone, the vertical angular position of the sensor 220, and the horizontal angular position of the sensor 220, or any range information. In some embodiments, multiple sensor at different locations may identify the threat, the location data from these sensors may be used to determine the location of the threat using triangulation techniques.

At block 320, the light source 215 may be directed toward the threat. The light source may be directed toward the threat by knowing the GPS location of the drone, adjusting the horizontal angle of the light source 215, the vertical angle of the light source 215, the position of the drone 200 within the environment, etc. For example, if data from the sensor 220 on the drone 200 was used to identify the threat, then the light source 215 may be moved to the same vertical angular position or horizontal angular position.

At block 325, the light source 215 may be illuminated. In some embodiments, prior to illuminating the light source 215, a second identification of threat may be made to ensure that the threat is actionable prior to illuminating or distracting the threat.

At block 330, the area near the threat may be scanned with either or both the sensor 220 or the light source 215. Since threats may be mobile and may move such as, for example, when hit with a bright light, the light source 215 may rapidly scan the area near the threat to improve the likelihood that light from the light source 215 is distracting the threat. In some embodiments, the drone may also move toward the threat or around obstacles or barriers improve the likelihood that light can distract the threat.

In some embodiments, the drone 200 may communicate the location of the threat to other drones, the satellite 105, one or more terrestrial wireless towers 115 or one or more terrestrial antennas 110. In some embodiments, other drones may receive data about the location of the threat and illuminate the location of the threat with a light source.

In some embodiments, the sensor may include a microphone. And the system may detect gun shots or threatening words.

In some embodiments, the light source 215 may be replaced with a directional speaker.

Systems and methods are disclosed to place a barrier near a threat to help in neutralizing or minimizing the potential damage created by the threat.

Figure 1B:
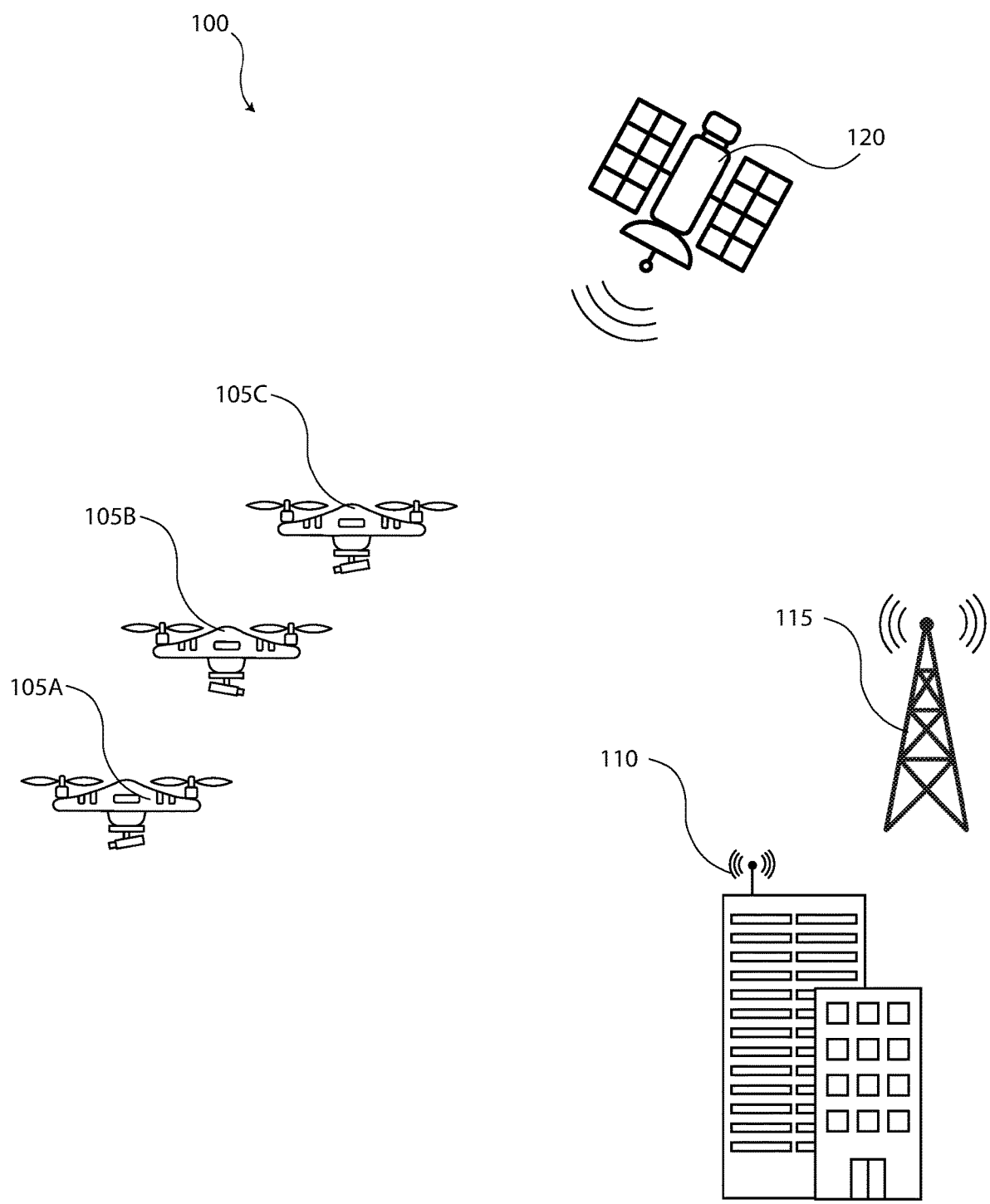
FIG. 1B illustrates an example drone network according to some embodiments.

FIG. 1B illustrates an example drone network 100 according to some embodiments. The drone network 100 may include a plurality of drones 105A, 105B, 105C (individually or collectively drones 105). The drone network 100 may include one or more satellites 120, one or more terrestrial wireless towers 115 or one or more terrestrial antennas 110. The drone network 100 may also include one or more terrestrial sensor network that may include, for example, video cameras, microphones, entry sensors, etc.

The drones 105 may include any type of drones such as, for example, autonomous drones, semi-autonomous drones, or user operated drones. The drones, for example, may include an unmanned aerial vehicle, a quadcopter, a multi-rotor drone, micro air vehicle, etc. In some embodiments, the drones may include one or more sensors such as, for example, cameras, microphones, etc. In some embodiments, the drones may include any type of distractor such as, for example, lasers, physical distractor, non-physical distractors, guns, cannons, spray guns, etc.

In some embodiments, the drones 105 may communicate wirelessly with each other. For example, the drones may communicate position and trajectory data with each other such as, for example, to avoid future collisions. As another example, the drones 105 may communicate terrestrial mapping information that may include data regarding the terrestrial profile of the area within which the drones are flying.

In some embodiments, the drones 105 may communicate wirelessly with one or more satellites 120. For example, a satellite 120 may communicate current GPS data to the drone 105. In some embodiments, a drone 105 may be in communication with a terrestrial communication system that may include one or more terrestrial wireless towers 115 or one or more terrestrial antennas 110. A ground station or command center may communicate data to and from the drones 105 via a satellite 120, a terrestrial wireless towers 115, or a terrestrial antenna 110. This data may include, for example, location, altitude, telemetry, trajectory, target data, flight time, return time, mission data, software updates, video, audio, etc.

In some embodiments, the drones 105 may operate within an environment that may include a street, a terminal, a stadium, a park, a concert, a theater, a political rally, a sporting event, a rally, a parade, etc.

Figure 2B:
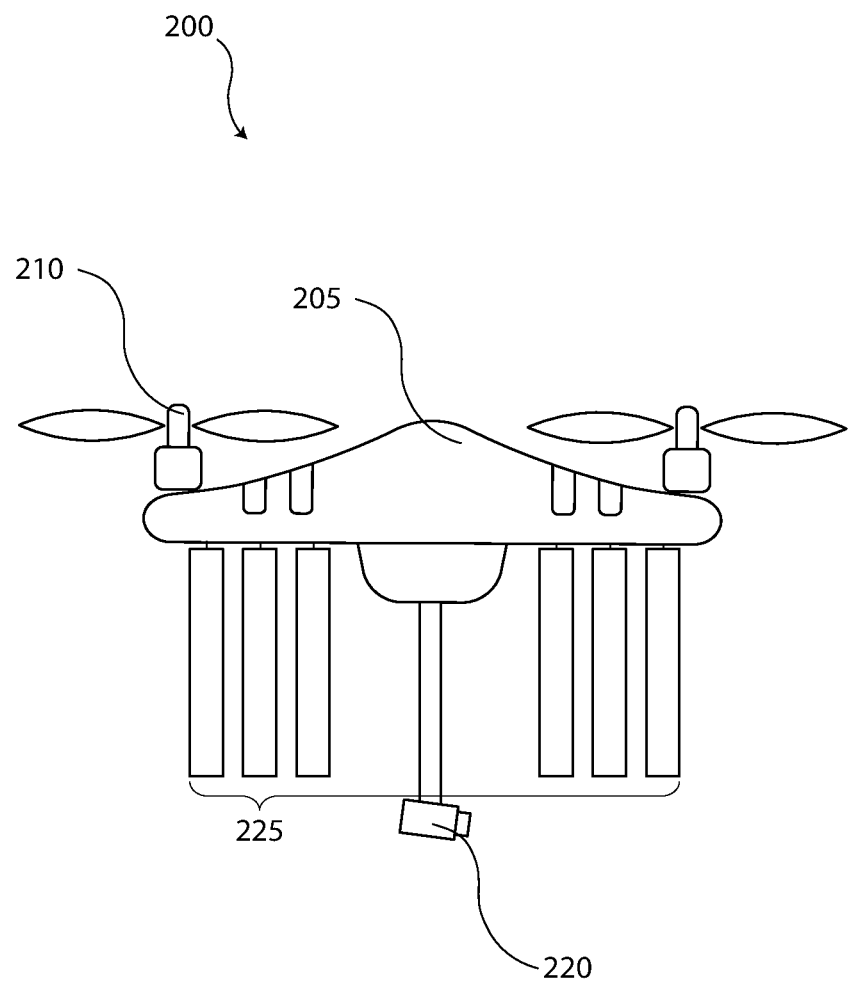
FIG. 2B is an illustration of a distractor drone according to some embodiments.

FIG. 2B is an illustration of a drone 200 according to some embodiments. The drone 200, for example, may include a drone body 205, one or more rotors 210 (or any other propulsion or lift mechanism/system), one or more sensors 220, or one or more barriers 225. In some embodiments, the drone 200 may include wireless communication systems that can communicate with various other devices or locations such as, for example, with satellite 120, other drones, terrestrial wireless towers 115, terrestrial antennas 110, mobile devices (e.g., phones, tablets, remote controllers, etc.), external sensors, external cameras, etc.

The sensor 220, for example, may include one or more video cameras or one or more microphones. The sensor 220, for example, may be disposed on a swivel that allows the sensor 220 to rotate 360 degrees and zero to ninety degrees from horizontal. The sensor 220 may communicate sensor data to a remote user or computer system via satellite 120, other drones, terrestrial wireless towers 115, terrestrial antennas 110, mobile devices (e.g., phones, tablets, remote controllers, etc.), external sensors, external cameras, etc.

In some embodiments, the one or more barriers 225 may include any type of barrier that can be carried and deployed by the drone 200. For example, the barrier 225 may include a deployable barrier that can be deployed using compressed gas. As another example, the barrier 225 may include a curtain or fabric that can be drop near a threat such as, for example, between a threat and a potential target. As another example, the barrier 225 may include reflective material. As another example, the barrier 225 may include material that blocks or diffracts light in the visible spectrum but does not block or diffract light outside the visible spectrum such as, for example, light outside the visible spectrum (e.g., infrared) that can be recorded by sensor 220. In some embodiments, the barrier 225 can be made of light weight material. As another example, the barrier 225 may include confetti such as, for example, highly reflective confetti. As another example, the barrier 225 may include smoke. As another example, the barrier 225 may include streamers such as, for example, highly reflective streamers.

In some embodiments, the barrier may be connected with a terrestrial structure such as, for example, a building, a stage, a stadium, etc. For example, the drone 200 may pull or flip barriers up from the ground to protect a target or pull or flip barriers down from a height to protect a target. As another example, screens can be pulled up, down, or across a hallway or corridor by a drown to close off the hallway or corridor.

In some embodiments, the drone 200 may include a computational system (e.g., computational system 400) that can process data from the sensor 220 and determine a threat, determine a location of the threat, and direct the drone to drop or deploy or unfurl or direct the barrier 225 near the threat, near a potential target, or between the threat and a potential target.

Figure 3B:
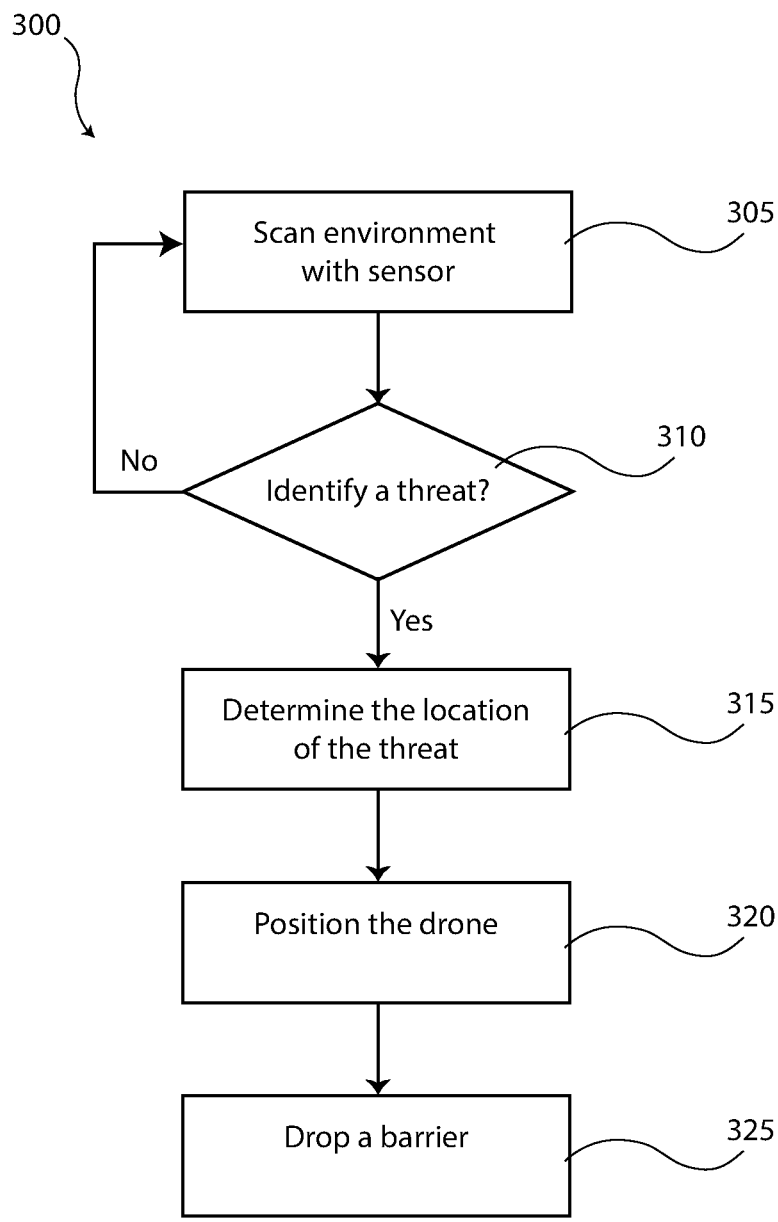
FIG. 3B is a flow chart of a process for placing a barrier near a threat using a drone according to some embodiments.

FIG. 3B is a flow chart of a process 300 for placing a barrier in response to a threat using a drone according to some embodiments. The process 300 may include additional blocks or steps. Any of the blocks shown in process 300 may be removed or executed in different order.

The process 300 may be executed in full or in part by a computation system on the drone, at a remote location (e.g., near the terrestrial antenna 110), at the satellite 120, on a nearby drone, etc.

The process 300 may begin at block 305. The environment may be scanned with a sensor. For example, the environment may be scanned with the sensor 220 mounted on the drone 200. As another example, the environment may be scanned with a terrestrial mounted sensor 220. As another example, the environment may be scanned by a sensor mounted on another nearby drone.

At block 310, the sensor 220 data can be used to identify a threat. The sensor data may include sensor data from one or more sensors on the drone 105, the satellite 110, or a terrestrial sensor, etc. In some embodiments, various artificial intelligence techniques may be used when scanning the environment to determine whether a threat is present. As an example, threat may be identified by visually detecting the presence of a weapon, a gun, a knife, or a bomb or by audibly detecting a gun shot or words identified as consistent with a threat (e.g., "bomb", "gun", "die", etc.).

For example, an artificial intelligence system (e.g., operating on or with a computational system on the drone or within the system 100), may be trained to identify a weapon by training the algorithm with a plurality of images that have a weapon identified. This training can be used so the artificial intelligence system can identify a weapon within the environment.

At block 315 the location of the threat may be identified. For example, if data from the sensor 220 on the drone 200 identifies the threat, then the location of threat may be determined based on the GPS position of the drone, the vertical angular position of the sensor 220, and the horizontal angular position of the sensor 220, or any range information. In some embodiments, multiple sensor at different locations may identify the threat, the location data from these sensors may be used to determine the location of the threat using triangulation techniques.

At block 320, the drone may be positioned near the threat, near a target, or between the threat and the target.

At block 325, the drone may drop (or deploy or unfurl or direct) the barrier 225 near the threat, near a potential target, or between the threat and a potential target. The time between positioning of the drone and dropping the barrier may take more or less time depending on the perceived urgency of the threat. In some embodiments, prior to dropping the barrier, a second identification of threat may be made to ensure that the threat is actionable prior to dropping the barrier.

In some embodiments, one or more barriers may be dropped. In some embodiments, a first barrier may be dropped at block 325, and process 300 may proceed back to block 320 and the drone can reposition itself near the threat, near a potential target, or between the threat and a potential target prior to dropping another barrier at block 325. Blocks 320 and 325 may be repeated until all barriers have been dropped.

In some embodiments, the drone 200 may communicate the location of the threat to other drones, the satellite 105, one or more terrestrial wireless towers 115 or one or more terrestrial antennas 110. In some embodiments, other drones may receive data about the location of the threat and drop barriers near the threat, near a potential target, or between the threat and a potential target.

In some embodiments, the sensor may include a microphone.

Systems and methods are disclosed to launch a projectile, fluid, or gas at or near a threat from an airborne drone to help in neutralizing or minimizing the potential damage that could be created by the threat.

Figure 1C:
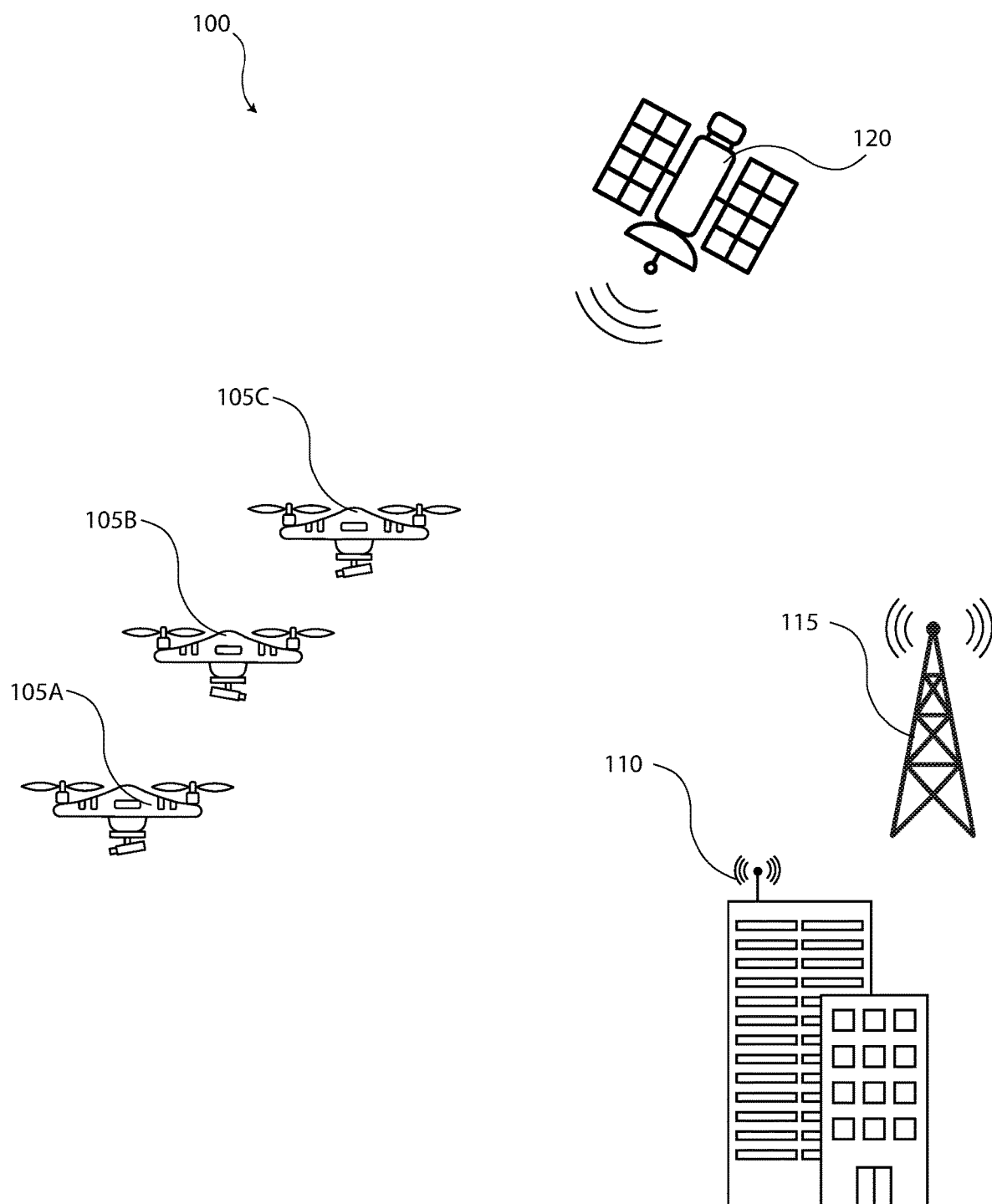
FIG. 1C illustrates an example drone network according to some embodiments.

FIG. 1C illustrates an example drone network 100 according to some embodiments. The drone network 100 may include a plurality of drones 105A, 105B, 105C (individually or collectively drones 105). The drone network 100 may include one or more satellites 120, one or more terrestrial wireless towers 115 or one or more terrestrial antennas 110. The drone network 100 may also include one or more terrestrial sensor network that may include, for example, video cameras, microphones, entry sensors, etc.

The drones 105 may include any type of drones such as, for example, autonomous drones, semi-autonomous drones, or user operated drones. The drones, for example, may include an unmanned aerial vehicle, a quadcopter, a multi-rotor drone, micro air vehicle, etc. In some embodiments, the drones may include one or more sensors such as, for example, cameras, microphones, etc. In some embodiments, the drones may include any type of distractor such as, for example, lasers, physical distractor, non-physical distractors, guns, cannons, spray guns, etc.

In some embodiments, the drones 105 may communicate wirelessly with each other. For example, the drones may communicate position and trajectory data with each other such as, for example, to avoid future collisions. As another example, the drones 105 may communicate terrestrial mapping information that may include data regarding the terrestrial profile of the area within which the drones are flying.

In some embodiments, the drones 105 may communicate wirelessly with one or more satellites 120. For example, a satellite 120 may communicate current GPS data to the drone 105. In some embodiments, a drone 105 may be in communication with a terrestrial communication system that may include one or more terrestrial wireless towers 115 or one or more terrestrial antennas 110. A ground station or command center may communicate data to and from the drones 105 via a satellite 120, a terrestrial wireless towers 115, or a terrestrial antenna 110. This data may include, for example, location, altitude, telemetry, trajectory, target data, flight time, return time, mission data, software updates, video, audio, etc.

In some embodiments, the drones 105 may operate within an environment that may include a street, a terminal, a stadium, a park, a concert, a theater, a political rally, a sporting event, a rally, a parade, etc.

Figure 2C:
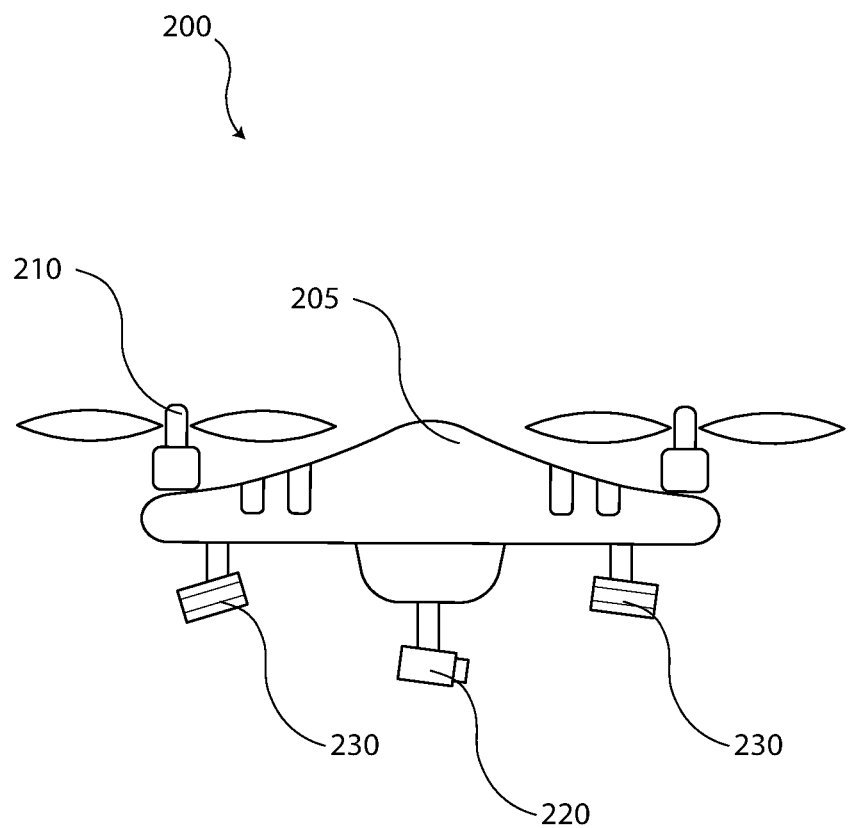
FIG. 2C is an illustration of a distractor drone according to some embodiments.

FIG. 2C is an illustration of a drone 200 according to some embodiments. The drone 200, for example, may include a drone body 205, one or more rotors 210 (or any other propulsion or lift mechanism/system), one or more sensors 220, or one or more launchers 230. In some embodiments, the drone 200 may include wireless communication systems that can communicate with various other devices or locations such as, for example, with satellite 120, other drones, terrestrial wireless towers 115, terrestrial antennas 110, mobile devices (e.g., phones, tablets, remote controllers, etc.), external sensors, external cameras, etc.

The sensor 220, for example, may include one or more video cameras or one or more microphones. The sensor 220, for example, may be disposed on a swivel that allows the sensor 220 to rotate 360 degrees and zero to ninety degrees from horizontal. The sensor 220 may communicate sensor data to a remote user or computer system via satellite 120, other drones, terrestrial wireless towers 115, terrestrial antennas 110, mobile devices (e.g., phones, tablets, remote controllers, etc.), external sensors, external cameras, etc.

In some embodiments, the one or more launchers 230 may launch any type of projectile, gas, or liquid. In some embodiments, the projectile may include any type of projectile that is meant to distract, slow down, or neutralize but not kill a target. For example, a projectile may include bean bags, rubber bullets, paint balls, etc. For example, the liquid may include mace, pepper spray, water, or sticky material, etc. For example, the gas may include smoke, colored smoke, etc.

In some embodiments, the one or more launchers 230 may launch a projectile using any type of propulsion such as, for example, compressed air, etc.

In some embodiments, each of the one or more launchers 230, for example, may be disposed on a swivel that allows the launcher 230 to rotate 360 degrees and zero to ninety degrees from horizontal.

Figure 3C:
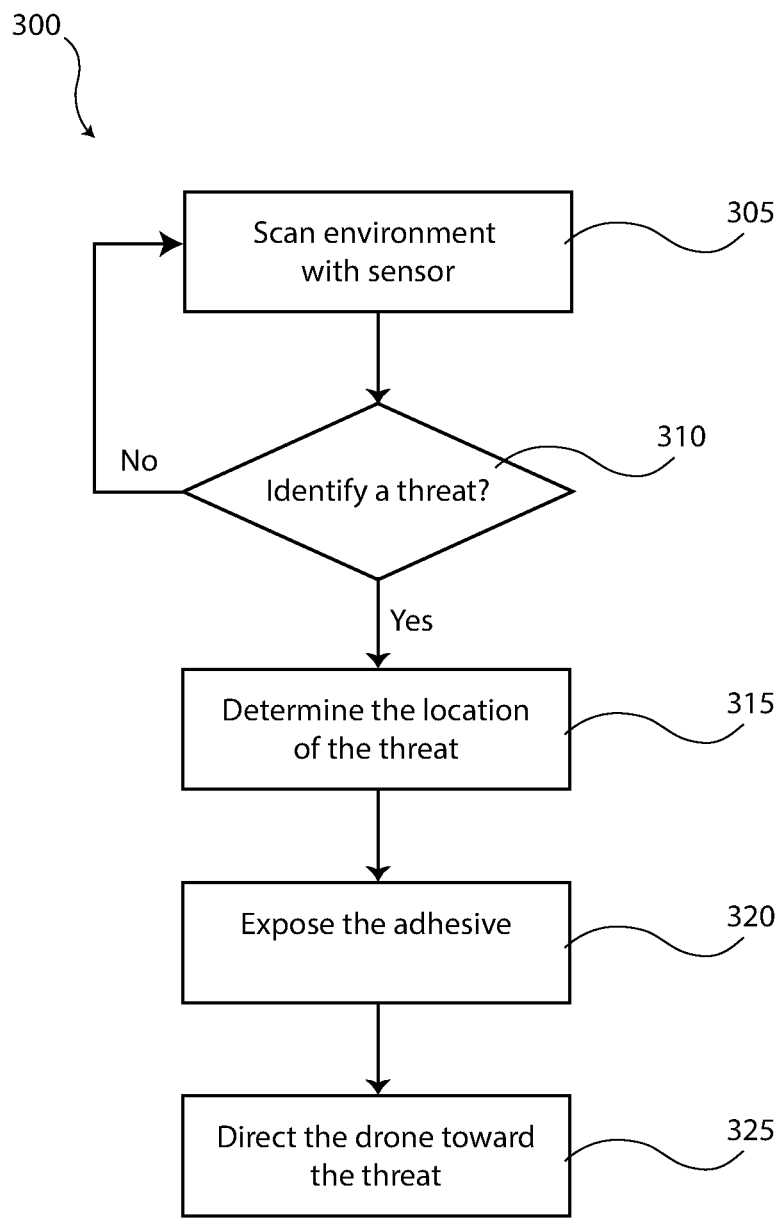
FIG. 3C is a flow chart of a process for launching a projectile, gas or fluid at or near a threat using a drone according to some embodiments.

In some embodiments, the drone 200 may include a computational system (e.g., computational system 400) that can process data from the sensor 220 and determine a threat, determine a location of the threat, aim a launcher at the threat, and launch projectiles or gas or fluid at the threat. FIG. 3C is a flow chart of a process 300 for launching projectiles, gas, or fluid in response to a threat using a drone according to some embodiments. The process 300 may include additional blocks or steps. Any of the blocks shown in process 300 may be removed or executed in different order.

The process 300 may be executed in full or in part by a computation system on the drone, at a remote location (e.g., near the terrestrial antenna 110), at the satellite 120, on a nearby drone, etc.

The process 300 may begin at block 305. The environment may be scanned with a sensor. For example, the environment may be scanned with the sensor 220 mounted on the drone 200. As another example, the environment may be scanned with a terrestrial mounted sensor 220. As another example, the environment may be scanned by a sensor mounted on another nearby drone.

At block 310, the sensor 220 data can be used to identify a threat. The sensor data may include sensor data from one or more sensors on the drone 105, the satellite 110, or a terrestrial sensor, etc. In some embodiments, various artificial intelligence techniques may be used when scanning the environment to determine whether a threat is present. As an example, threat may be identified by visually detecting the presence of a weapon, a gun, a knife, or a bomb or by audibly detecting a gun shot or words identified as consistent with a threat (e.g., "bomb", "gun", "die", etc.).

For example, an artificial intelligence system (e.g., operating on or with a computational system on the drone or within the system 100), may be trained to identify a weapon by training the algorithm with a plurality of images that have a weapon identified. This training can be used so the artificial intelligence system can identify a weapon within the environment.

At block 315 the location of the threat may be identified. For example, if data from the sensor 220 on the drone 200 identifies the threat, then the location of threat may be determined based on the GPS position of the drone, the vertical angular position of the sensor 220, and the horizontal angular position of the sensor 220, or any range information. In some embodiments, multiple sensor at different locations may identify the threat, the location data from these sensors may be used to determine the location of the threat using triangulation techniques.

At block 320, the one or more launchers 230 may be directed toward the threat. The one or more launchers 230 may be directed toward the threat by knowing the GPS location of the drone, adjusting the horizontal angle of the one or more launchers 230, the vertical angle of the one or more launchers 230, the position of the drone 200 within the environment, etc. For example, if data from the sensor 220 on the drone 200 was used to identify the threat, then the li one or more launchers 230 may be moved to substantially the same vertical angular position or horizontal angular position.

At block 325, the one or more launchers 230 may launch one or more projectiles, gases, or fluids toward the threat. In some embodiments, prior to launching, a second identification of threat may be made to ensure that the threat is actionable prior to illuminating or distracting the threat.

In some embodiments, the drone 200 may communicate the location of the threat to other drones, the satellite 105, one or more terrestrial wireless towers 115 or one or more terrestrial antennas 110. In some embodiments, other drones may receive data about the location of the threat and/or launch projectiles toward the threat.

In some embodiments, the sensor may include a microphone. And the system may detect gun shots or threatening words.

In some embodiments, the sensor may include a microphone.

Systems and methods are disclosed to launch an airborne drone with an adhesive at a threat to help in neutralize or minimize the potential damage that could be created by the threat.

Figure 1D:
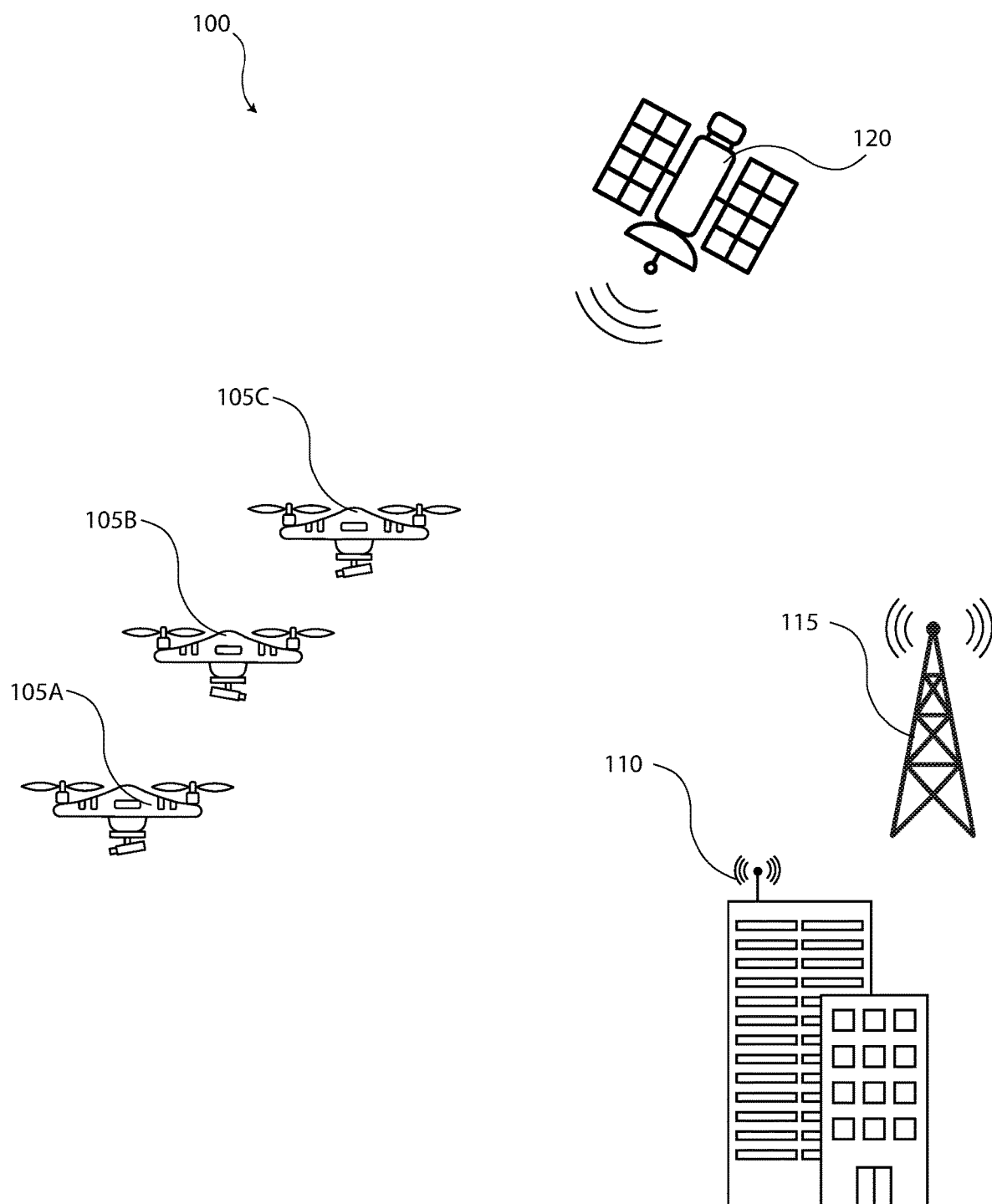
FIG. 1D illustrates an example drone network according to some embodiments.

FIG. 1D illustrates an example drone network 100 according to some embodiments. The drone network 100 may include a plurality of drones 105A, 105B, 105C (individually or collectively drones 105). The drone network 100 may include one or more satellites 120, one or more terrestrial wireless towers 115 or one or more terrestrial antennas 110. The drone network 100 may also include one or more terrestrial sensor network that may include, for example, video cameras, microphones, entry sensors, etc.

The drones 105 may include any type of drones such as, for example, autonomous drones, semi-autonomous drones, or user operated drones. The drones, for example, may include an unmanned aerial vehicle, a quadcopter, a multirotor drone, micro air vehicle, etc. In some embodiments, the drones may include one or more sensors such as, for example, cameras, microphones, etc. In some embodiments, the drones may include any type of distractor such as, for example, lasers, physical distractor, non-physical distractors, guns, cannons, spray guns, etc.

In some embodiments, the drones 105 may communicate wirelessly with each other. For example, the drones may communicate position and trajectory data with each other such as, for example, to avoid future collisions. As another example, the drones 105 may communicate terrestrial mapping information that may include data regarding the terrestrial profile of the area within which the drones are flying.

In some embodiments, the drones 105 may communicate wirelessly with one or more satellites 120. For example, a satellite 120 may communicate current GPS data to the drone 105. In some embodiments, a drone 105 may be in communication with a terrestrial communication system that may include one or more terrestrial wireless towers 115 or one or more terrestrial antennas 110. A ground station or command center may communicate data to and from the drones 105 via a satellite 120, a terrestrial wireless towers 115, or a terrestrial antenna 110. This data may include, for example, location, altitude, telemetry, trajectory, target data, flight time, return time, mission data, software updates, video, audio, etc.

In some embodiments, the drones 105 may operate within an environment that may include a street, a terminal, a stadium, a park, a concert, a theater, a political rally, a sporting event, a rally, a parade, etc.

Figure 2D:
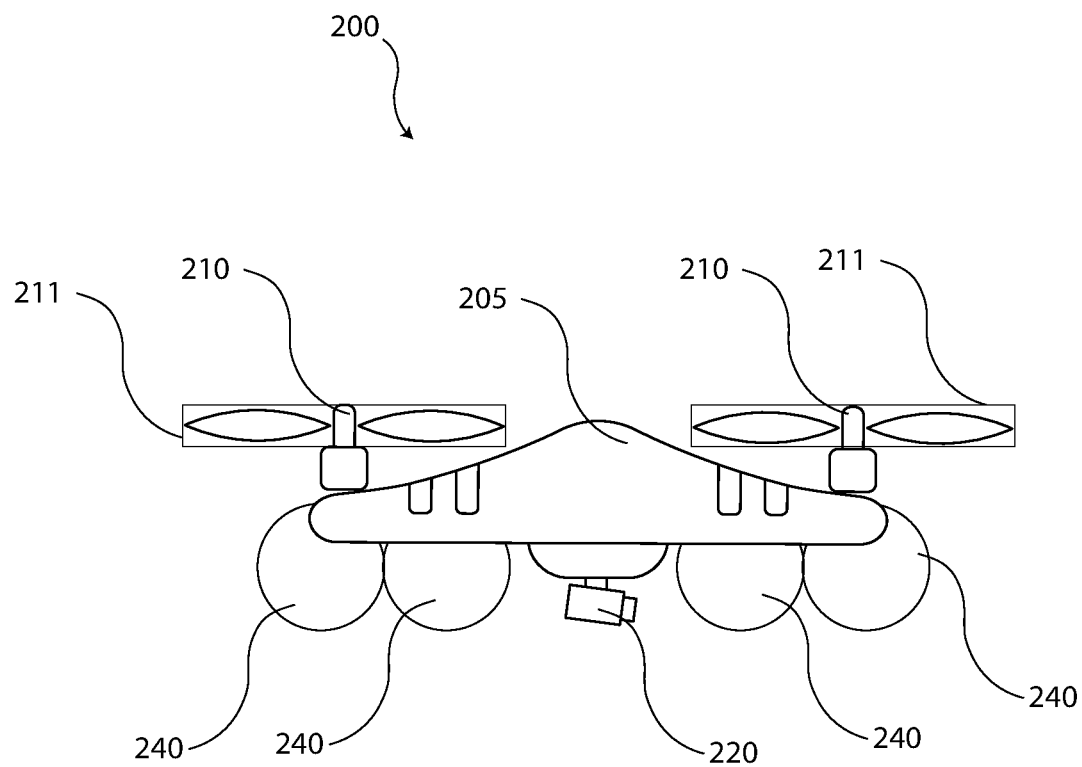
FIG. 2D is an illustration of a distractor drone according to some embodiments.

FIG. 2D is an illustration of a drone 200 according to some embodiments. The drone 200, for example, may include a drone body 205, one or more rotors 210 (or any other propulsion or lift mechanism/system), one or more sensors 220, or one or more adhesive surfaces 240. In some embodiments, the rotors may include a protective shroud 211. In some embodiments, the drone 200 may include wireless communication systems that can communicate with various other devices or locations such as, for example, with satellite 120, other drones, terrestrial wireless towers 115, terrestrial antennas 110, mobile devices (e.g., phones, tablets, remote controllers, etc.), external sensors, external cameras, etc.

The sensor 220, for example, may include one or more video cameras or one or more microphones. The sensor 220, for example, may be disposed on a swivel that allows the sensor 220 to rotate 360 degrees and zero to ninety degrees from horizontal. The sensor 220 may communicate sensor data to a remote user or computer system via satellite 120, other drones, terrestrial wireless towers 115, terrestrial antennas 110, mobile devices (e.g., phones, tablets, remote controllers, etc.), external sensors, external cameras, etc. In some embodiments, the sensor 220 may be retractable.

In some embodiments, the one or more adhesive surfaces 240 may include any type of sticky substance such as, for example, glue, gum, rubber, tar, vinyl adhesive, PVC tape, glass bond, polystyrene glue, sugru, modeling glay, milliput, thermoplastic, etc. In some embodiments, the one or more adhesive surfaces 240 may be inflatable. In some embodiments, the one or more adhesive surfaces 204 may be disposed on a portion of the drone body 205 opposite the rotors 210 such as, for example, on the bottom of the drone body 205. In some embodiments, the one or more adhesive surfaces 240 may be retractable or may have a retractable covering. In some embodiments, the one or more adhesive surfaces 240 may include a substance that may be mixed together to become adhesive.

In some embodiments, the drone 200 may include a computational system (e.g., computational system 400) that can process data from the sensor 220 and determine a threat, determine a location of the threat, aim a launcher at the threat, and launch projectiles or gas or fluid at the threat.

Figure 3D:
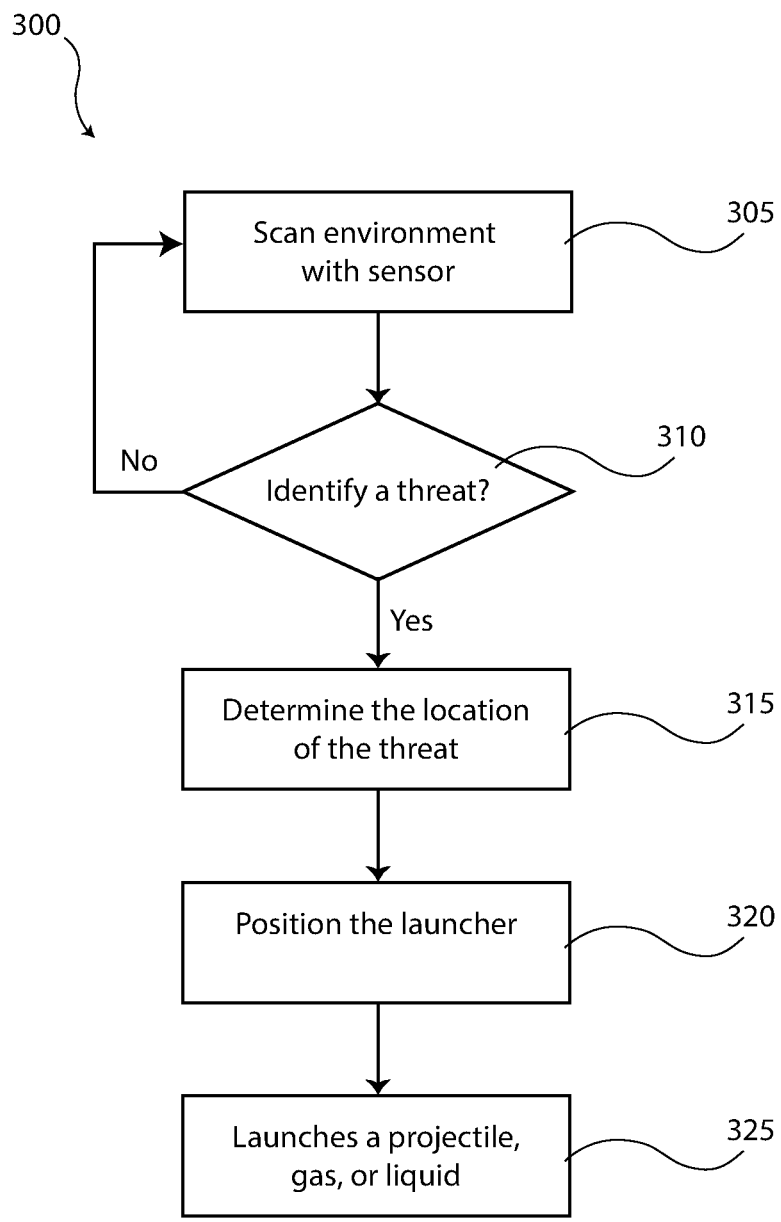
FIG. 3D is a flow chart of a process for launching an adhesive airborne drone toward a threat according to some embodiments.

FIG. 3D is a flow chart of a process 300 for launching an adhesive airborne drone toward a threat according to some embodiments. The process 300 may include additional blocks or steps. Any of the blocks shown in process 300 may be removed or executed in different order.

The process 300 may be executed in full or in part by a computation system on the drone, at a remote location (e.g., near the terrestrial antenna 110), at the satellite 120, on a nearby drone, etc.

The process 300 may begin at block 305. The environment may be scanned with a sensor. For example, the environment may be scanned with the sensor 220 mounted on the drone 200. As another example, the environment may be scanned with a terrestrial mounted sensor 220. As another example, the environment may be scanned by a sensor mounted on another nearby drone.

At block 310, the sensor 220 data can be used to identify a threat. The sensor data may include sensor data from one or more sensors on the drone 105, the satellite 110, or a terrestrial sensor, etc. In some embodiments, various artificial intelligence techniques may be used when scanning the environment to determine whether a threat is present. As an example, threat may be identified by visually detecting the presence of a weapon, a gun, a knife, or a bomb or by audibly detecting a gun shot or words identified as consistent with a threat (e.g., "bomb", "gun", "die", etc.).

For example, an artificial intelligence system (e.g., operating on or with a computational system on the drone or within the system 100), may be trained to identify a weapon by training the algorithm with a plurality of images that have a weapon identified. This training can be used so the artificial intelligence system can identify a weapon within the environment.

At block 315 the location of the threat may be identified. For example, if data from the sensor 220 on the drone 200 identifies the threat, then the location of threat may be determined based on the GPS position of the drone, the vertical angular position of the sensor 220, and the horizontal angular position of the sensor 220, or any range information. In some embodiments, multiple sensor at different locations may identify the threat, the location data from these sensors may be used to determine the location of the threat using triangulation techniques.

At block 320 the adhesive may be exposed. For example, the adhesive may be exposed by retracting a cover. As another example, the adhesive may be exposed by inflating an adhesive surface 240. As another example, the adhesive may be exposed by mixing one or more chemicals. As another example, the adhesive may be exposed by exposing a substance to atmospheric air.

At block 325, the drone may fly directly toward to the threat. In some embodiments, the drone may orient its approach to the threat by positioning (or angling) the bottom of the drone toward the threat as the drown approaches the threat. For example, if the one or more adhesive surfaces are on the bottom of the drone, then the drone may approach the threat by directing the bottom of the drone toward the threat. In some embodiments, the drone may continue to fly direct to the threat until contact is made with the threat. In some embodiments, the rotors may continue to operate for a time period after contact has been made with the threat.

In some embodiments, the drone 200 may communicate the location of the threat to other drones, the satellite 105, one or more terrestrial wireless towers 115 or one or more terrestrial antennas 110. In some embodiments, other drones may receive data about the location of the threat and be directed to adhere to the threat.

In some embodiments, the sensor may include a microphone. And the system may detect gun shots or threatening words.

In some embodiments, the sensor may include a microphone.

Figure 4:
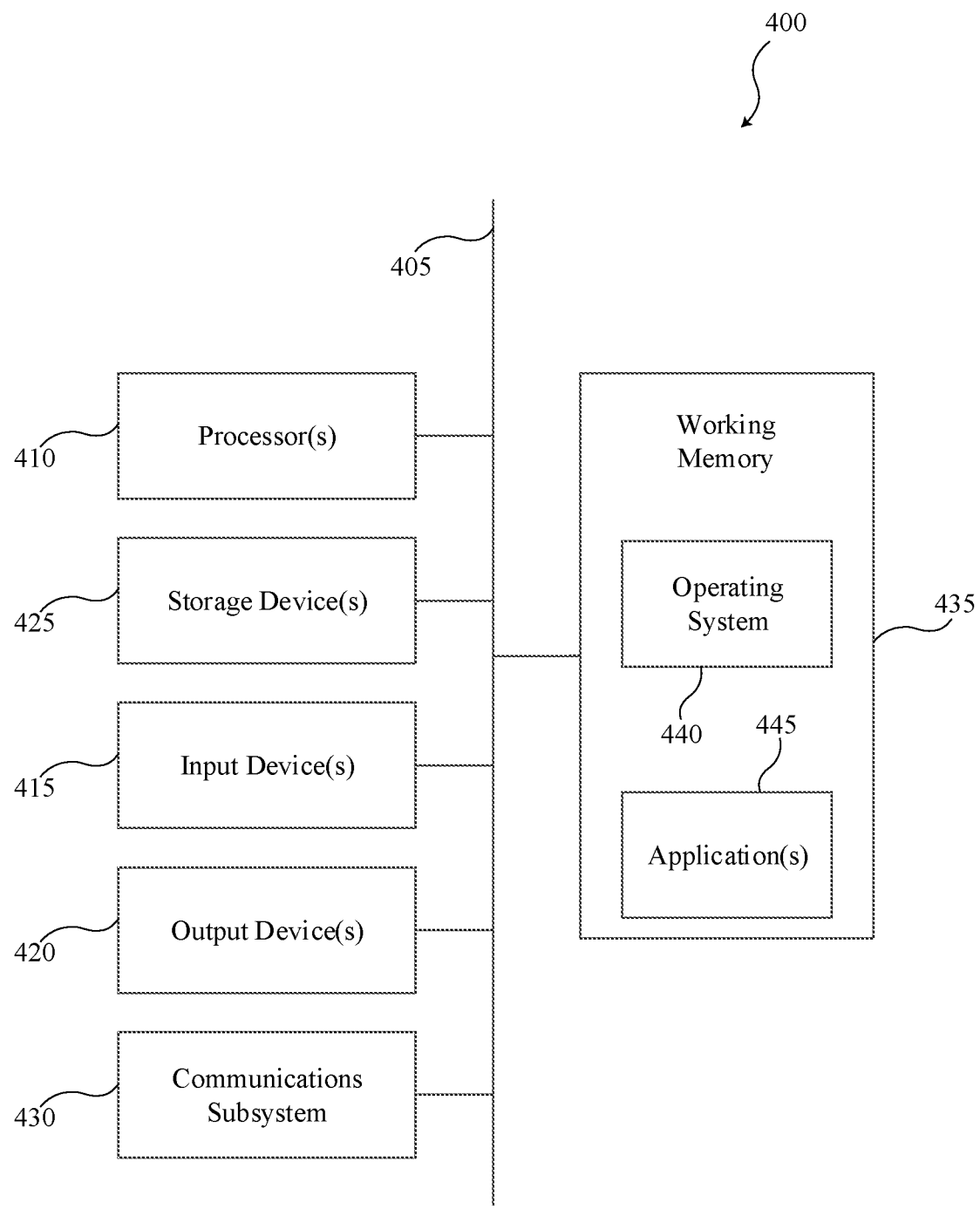
FIG. 4 shows an illustrative computational system for performing functionality to facilitate implementation of embodiments described herein.

The computational system 400, shown in FIG. 4 can be used to perform any of the embodiments of the invention. For example, computational system 400 can be used to execute process 300. As another example, computational system 400 can be used perform any calculation, identification and/or determination described here. Computational system 400 includes hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computational system 400 may further include (and/or be in communication with) one or more storage devices 425, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 400 might also include a communications subsystem 430, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 430 may permit data to be exchanged with a network (such as the network described below, to name one example), and/or any other devices described herein. In many embodiments, the computational system 400 will further include a working memory 435, which can include a RAM or ROM device, as described above.

The computational system 400 also can include software elements, shown as being currently located within the working memory 435, including an operating system 440 and/or other code, such as one or more application programs 445, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 425 described above.

In some cases, the storage medium might be incorporated within the computational system 400 or in communication with the computational system 400. In other embodiments, the storage medium might be separate from a computational system 400 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 400 and/or might take the form of source and/or installable code, which, upon compilation and/or installation on the computational system 400 (e.g., using any of a variety of generally available compilers, installation programs, compression/decompression utilities, etc.) then takes the form of executable code.

In some embodiments, the computational system 400 may also communicate with navigation and control systems of a drone and/or remote communication systems.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   scanning an environment with a sensor mounted on a drone and producing sensor data, wherein the sensor data includes sensor location data;
   detecting a threat within the environment from the sensor data by a computational system on the drone;
   making a first visual identification of the threat using the sensor data by the computational system on the drone;
   determining the location of the threat based on the sensor location data, the GPS position of the drone, vertical angular position of the sensor and the horizontal angular position of the sensor;
   making a second identification confirmation of the threat by the computational system on the drone to ensure that the threat is actionable prior to dropping one or more barriers; and
   dropping the one or more barriers after making the second identification confirmation.

2. The method according to claim 1, wherein the sensor data includes sensor data from one or more sensors on the drone, a satellite, a terrestrial sensor, and a second drone.

3. The method according to claim 1, wherein the sensor data includes sensor angle, position, or directionality data.

4. The method according to claim 1, further comprising moving the drone to a location near the threat.

5. The method according to claim 1, further comprising moving the drone to a location between the threat and a potential target.

6. The method according to claim 1, further comprising moving the drone to a location near a target.

7. A drone that executes the method of claim 1.

8. A method comprising:
   scanning an environment with a sensor mounted on a drone and producing sensor data, wherein the sensor data includes sensor location data;
   detecting a threat within the environment from the sensor data by a computational system on the drone;
   making a first visual identification of the threat using the sensor data by the computational system on the drone;

determining the location of the threat based on the sensor location data, the GPS position of the drone, vertical angular position of the sensor and the horizontal angular position of the sensor;

exposing an adhesive surface, making a second identification confirmation of the threat by the computational system on the drone to ensure that the threat is actionable prior to directing a drone toward the threat; and directing the drone toward the threat after making the second identification confirmation.

9. The method according to claim 8, wherein the sensor data includes sensor data from one or more sensors on the drone, a satellite, a terrestrial sensor, and a second drone.

10. The method according to claim 8, wherein the sensor data includes sensor angle, position, or directionality data.

11. The method according to claim 8, further comprising moving the drone to a location between the threat and a potential target.

12. A drone that executes the method of claim 8.

13. A method comprising:

scanning an environment with a sensor mounted on a drone and producing sensor data, wherein the sensor data includes sensor location data;

detecting a threat within the environment from the sensor data by a computational system on the drone;

making a first visual identification of the threat using the sensor data;

determining the location of the threat based on the sensor location data, the GPS position of the drone, vertical angular position of the sensor and the horizontal angular position of the sensor;

directing a launcher toward the threat based on the location, making a second identification confirmation of the threat by the computational system on the drone to ensure that the threat is actionable prior to launching a projectile, gas or fluid; and launching the projectile, gas or fluid at or near the threat after making the second identification confirmation.

14. The method according to claim 13, wherein the sensor data includes sensor data from one or more sensors on the drone, a satellite, a terrestrial sensor, and a second drone.

15. The method according to claim 13, wherein the sensor data includes sensor angle, position, or directionality data.

16. The method according to claim 13, further comprising moving the drone to a location near the threat.

17. The method according to claim 13, further comprising moving the drone to a location between the threat and a potential target.

18. The method according to claim 13, further comprising moving the drone to a location near a target.

19. A drone that executes the method of claim 13.

* * * * *